July 28, 1931. W. C. PITTER 1,816,295
SPEED CHANGING GEAR AND CLUTCH THEREFOR
Filed Sept. 20, 1924 7 Sheets-Sheet 1

Inventor
Walter Charles Pitter
By B. Singer Atty

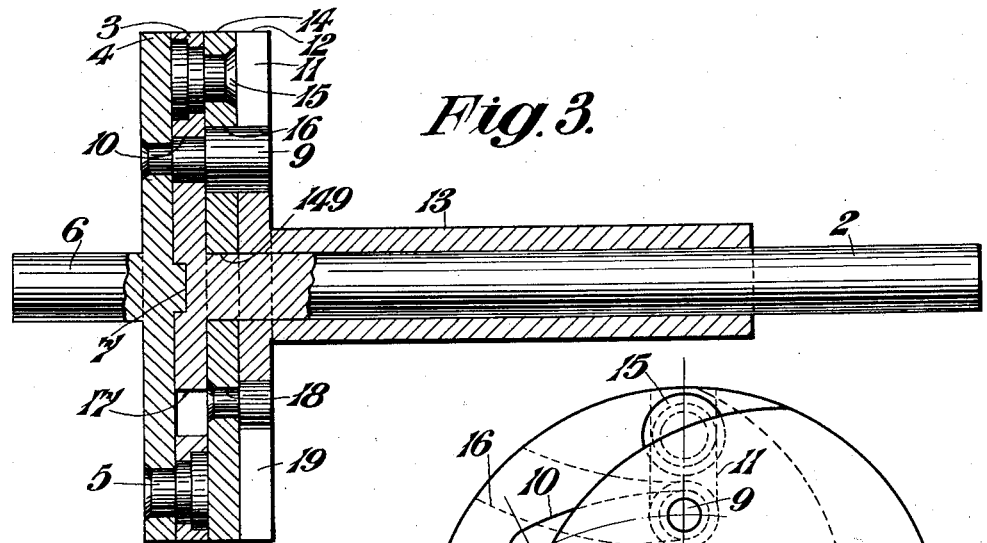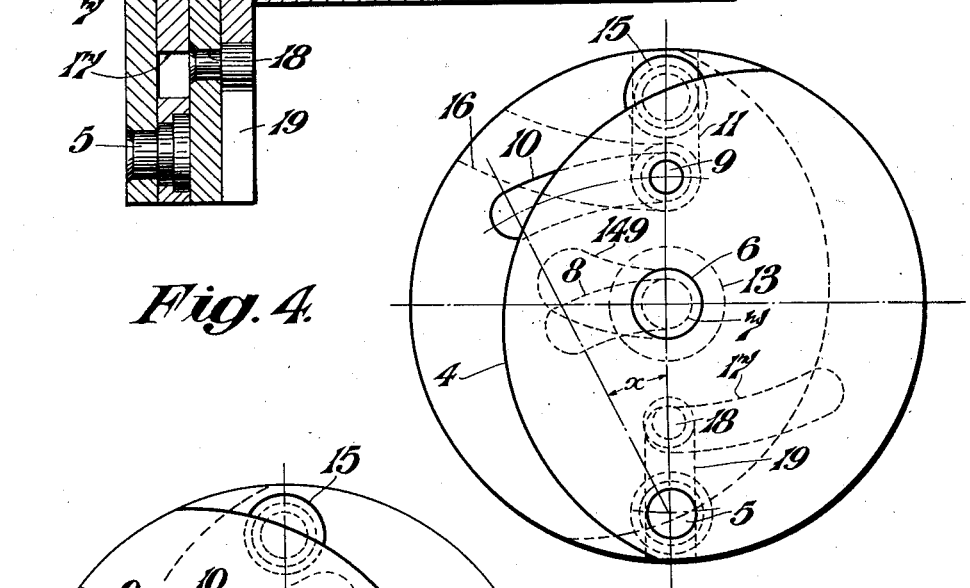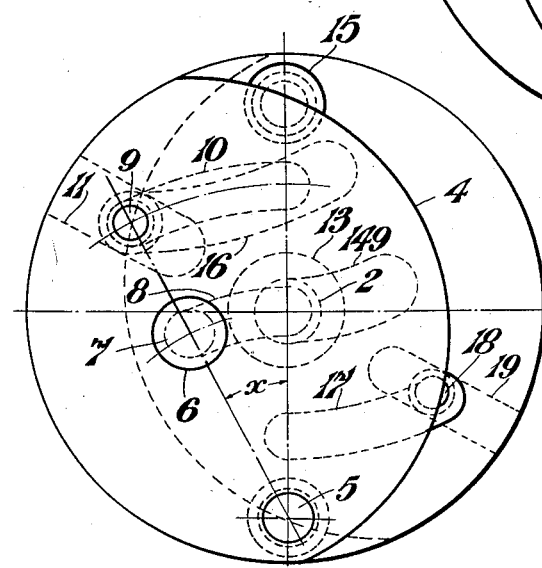

July 28, 1931. W. C. PITTER 1,816,295
SPEED CHANGING GEAR AND CLUTCH THEREFOR
Filed Sept. 20, 1924 7 Sheets-Sheet 4

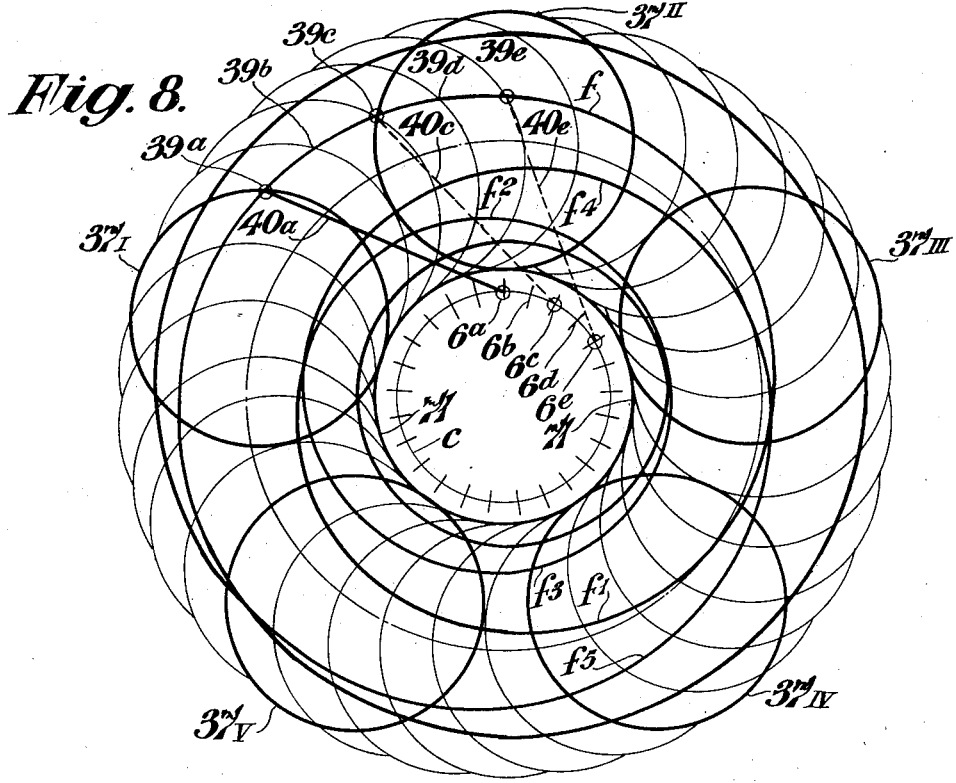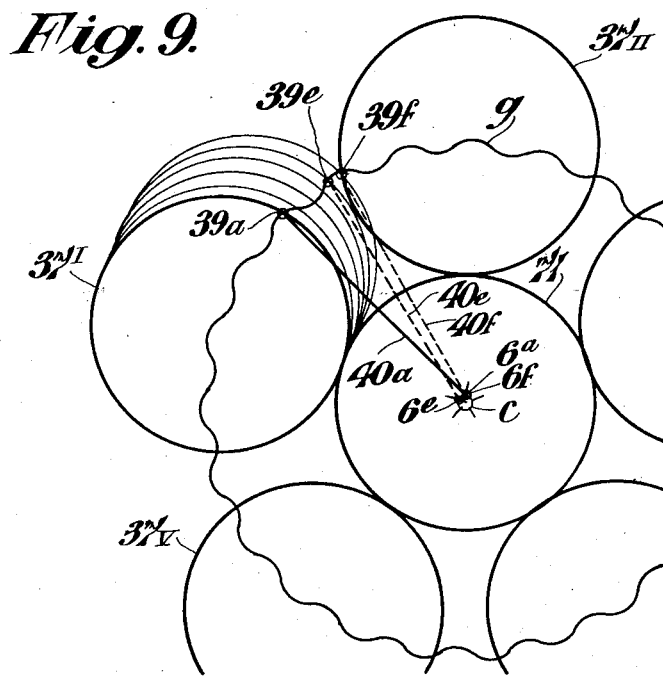

July 28, 1931. W. C. PITTER 1,816,295
SPEED CHANGING GEAR AND CLUTCH THEREFOR
Filed Sept. 20, 1924 7 Sheets-Sheet 6

Inventor
Walter Charles Pitter
By B. Singer. Atty.

July 28, 1931. W. C. PITTER 1,816,295
SPEED CHANGING GEAR AND CLUTCH THEREFOR
Filed Sept. 20, 1924 7 Sheets-Sheet 7

Inventor
Walter Charles Pitter
By B. Singer Atty

Patented July 28, 1931

1,816,295

UNITED STATES PATENT OFFICE

WALTER CHARLES PITTER, OF ELTHAM, ENGLAND, ASSIGNOR TO PITTER TRUST, A COMMON-LAW TRUST

SPEED CHANGING GEAR AND CLUTCH THEREFOR

Application filed September 20, 1924. Serial No. 738,829.

This invention relates to speed changing gear of the epicyclic kind and has for its object to provide a smooth running gear giving an infinitely variable change of speed between any desired prearranged fixed limits.

The invention comprises a variable stroke crank member mounted on an input or power shaft required to drive an output shaft at a reduced speed, and having a number of connecting links connecting it to crank pins driving through friction clutches, or one-way or free wheel mechanisms a corresponding number of gear wheels or pinions arranged around and operating in the teeth of a fixed or fixable central gear wheel in the centre of which is rotatably mounted a shaft connected to a member carrying the shafts of the outer gear wheels and transmitting the change of speed to the output shaft. This construction enables the mechanism to be so designed that the connecting links will always be in tension while transmitting power and the loci of the crank pins driving the outer gears or pinions will be closed curves varying from a slightly sinusoidal circular line at short strokes of the variable crank to large spirals or involute curves at long strokes of the crank, the outer gear wheels or pinions being uniformly distributed round the periphery of the central wheel so that the curves of the crank pins will intersect each other at regular intervals.

The variation in the stroke of the main crank may be effected in any suitable manner, the present invention however, also comprises a means of varying the stroke particularly applicable to this type of speed changing gear and such means consist of a shaft having at its end a disc on the outer surface of which slides about a pivot thereon a plate carrying on its outer surface the variable crank pin, while from its inner surface projects a pin passing through a slot in the disc at the end of the main shaft and also into a radial slot in a disc provided at the end of a sleeve or hollow shaft rotatable on the main shaft. Means are provided for rotating the main shaft relatively to the hollow shaft or sleeve through an angle varying with the variation in the stroke desired, and for holding them in such relative positions.

An embodiment of the invention is illustrated by the accompanying drawings wherein:—

Figure 1 is a longitudinal sectional view of the complete apparatus.

Figure 2 a transverse section through 2—2 of Fig. 1.

Figure 3 is a longitudinal section through the variable throw crank shown in Figure 1, Figure 4 is an end elevation of Figure 3, Figure 5 is a view of Figure 4 with the parts in a different position, Figure 6 is a diagram showing the loci of the crank pins with the variable throw crank at full stroke, Figure 7 is a diagram showing the loci of one crank when the variable throw crank is at a shorter stroke, Figure 8 is a diagram showing the intersecting loci of five cranks when the variable throw crank is at nearly full stroke.

Figure 9 is a diagram showing the loci of one of the cranks when the variable throw crank is at a very short stroke.

Figure 1:
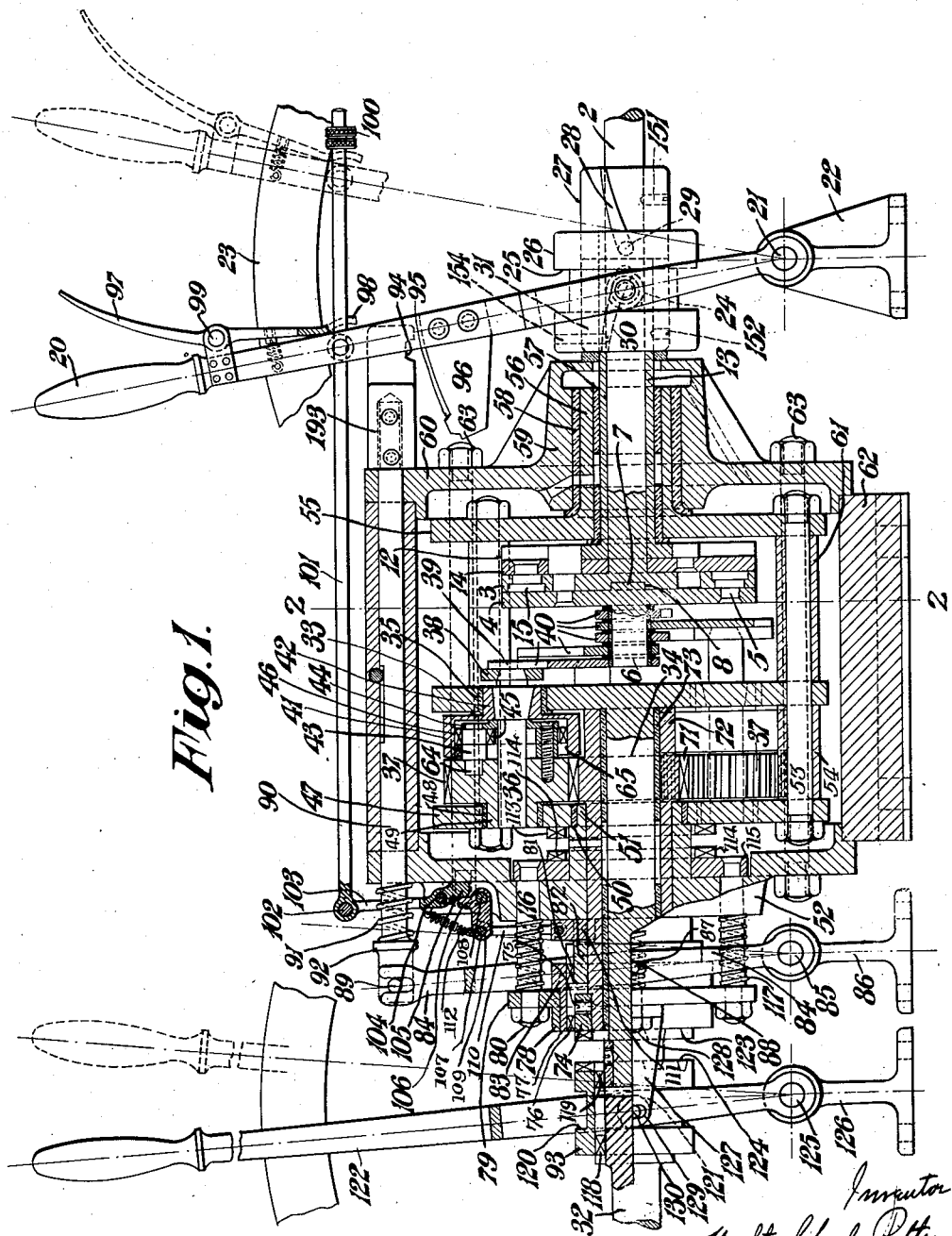

The variable throw crank as shown in Figure 1 and illustrated in detail in Figures 3, 4 and 5 consists of an input shaft 2 having at its end a disc 3 on the outer surface of which slides about a pivot pin 5 a disc 4. The disc 4 carries on its outer surface a crank pin 6 of which the throw is variable by the disc 4 sliding about the pivot pin 5. In Figure 4 the crank pin 6 is coincident with the input shaft 2 that is, it is at no-stroke position. In Figure 5 the disc 4 has been moved about the pivot pin 5 through an angle $x$, that is to full stroke position. At the back of the disc 4 is a projection 7 which moves in a curved groove 8 in the disc 3, this groove being of such a length as to give the desired limit of throw of the variable crank pin 6. Secured in the disc 4 is a pin 9 which projects from the inner surface of the disc through a curved slot 10 provided in the disc 3 and also into a radial slot 11 provided in a disc 12 formed on the end of a hollow shaft or sleeve 13 rotatable relatively to the shaft 2. By rotating the hollow shaft 13 relatively to the shaft 2 the slot 11 engages one side of the pin 9 carried by the disc 4 and so tilts it about its pivot 5 by an amount corresponding to the relative rotation of the shafts 13 and 2, which varies according to the variation in throw desired.

For the purpose of producing a balancing effect in the variable throw mechanism, an additional disc 14 is provided. This disc 14 is pivoted to the disc 3 by the pivot pin 15 on which it slides between the discs 3 and 12. The disc 14 is provided with a curved slot 16 to clear the pin 9, and a curved slot 149 to clear the shaft 2 and also with a pin 18 which projects into a radial slot 19 provided in the disc 12 diametrically opposite the slot 11. A slot 17 for balancing purposes is also provided in the disc 3. In order to effect relative movement between the shafts 2 and 13 to vary the throw of the crank pin 6 while the input shaft 2 is rotating at a high speed, hand lever mechanism is provided. This mechanism consists of a hand lever 20 having a fulcrum pin 21 mounted in a fixed bracket 22. The hand lever 20 moves over a fixed quadrant 23 to indicate by its relation to the quadrant any particular throw of the crank pin 6.

The lever 20 at its lower end is of the forked kind carrying at each side a roller 24 which rotates in a groove 25 provided in an outer sleeve 26 sliding on two inner sleeves 27 and 31, the sleeve 27 being secured to the input shaft 2 by a screw 151 and the sleeve 31 to the hollow shaft 13 by a screw 152. The sleeve 27 is provided with a helical slot 28 while the sleeve 31 is provided with an oppositely disposed helical slot 30. The outer sleeve 26 is provided with two pins one 29 which extends into the helical slot 28 and the other 154 which extends into the helical slot 30.

When the hand lever 20 is moved about its fulcrum 21 the rollers 24 carry the sleeve 26 axially with respect to the hollow shaft 13 but by reason of the key pins 29 and 154 moving in the helical slots 28 and 30 the hollow shaft 13 and the shaft 2 will be rotated relatively to each other in opposite directions.

In the example shown, 32 is the output shaft and motion is transmitted from the input shaft 2 to the output shaft 32 by means of epicyclic gearing consisting of five pinions 37 rotatively mounted on shafts 36 carried by a disc 33, the disc or carrier 33 being formed on the end of a shaft 34. The shafts 36 are mounted in bearings 35 in the carrier 33, only one of them being shown in section in Figure 1.

Each of the pinion shafts 36 is provided with a secondary crank 38 connected by a crank pin 39 and a connecting link 40 with the variable throw crank pin 6. The other ends of the pinion shafts 36 are supported by an annular disc 47 provided with bearings 48 in which rotate the bosses 49 of the pinions 37 in which rotate the pinion shafts 36. The annular disc 47 is rotatively mounted on a bearing 50 supported on a boss 51 extending from an end plate 52 of the framing supporting the complete mechanism.

The bearing or carrier discs 33 and 47 of the pinion shafts 36 are connected together by bolts 53 and distance pieces 54, an additional support to the disc 33 is provided in the form of a third annular disc 55 having a bearing hub 56 rotating on a bearing 57 on the hollow shaft 13, and also rotating in a bearing 58 in a boss 59 extending from a second end plate 60 of the framing of the mechanism.

The disc 55 is connected to the disc 33 by the bolts 53 and distance pieces 61. The ends 52 and 60 of the mechanism are connected together on a standard 62 by means of bolts 63.

The pinion shafts 36 transmit motion to the pinions 37 by one-way automatic clutches consisting of a cylindrical member 41 which has a reduced portion 42 extending into the bearing 35. The details of each pinion driving clutch are shown on an enlarged scale in Figures 10 and 11. The cylindrical member 41 forms the first element in each of the one-way clutch devices for transmitting motion from each pinion shaft 36 to its pinion 37. In each pinion 37 is formed a bearing for a reduced end portion 64 of a short shaft 43 the other end of the shaft being carried in a bearing in an annular disc 44 rotatively mounted on the shaft 36 and connected to the pinion 37 by screws 70 provided with distance sleeves 69.

There are three shafts 43 to each pinion, arranged at uniform distances from each other and from the centre of the pinion, and each carrying a small gear wheel 45 gearing with an internally toothed wheel 46 carried inside the cylindrical member 41.

The larger portions 43 of the shaft of the small gears 45 are adjacent a plain inner friction surface 65 and between this surface and the larger portions 43 of the shafts of the small gears 45 project wedge shaped pieces 66. The outer surface of each wedge 66 is curved to fit against the plain portion 65 of the annular member 41, while its opposite surface is straight and engages the portion 43 of the shaft of a small gear 45. Each of the wedges 66 is forced in the same circumferential direction between the friction surfaces of 43 and 65 by the free end of a spring 67, the other end of the spring is bent over a pin 68 and round the distance sleeve 69. The pins 68 are fixed in the body of the pinion 37.

The springs 67 bear on the rear of the wedges 66 so as to hold them continuously in engagement with the surfaces on 43 and 65.

Figure 2:
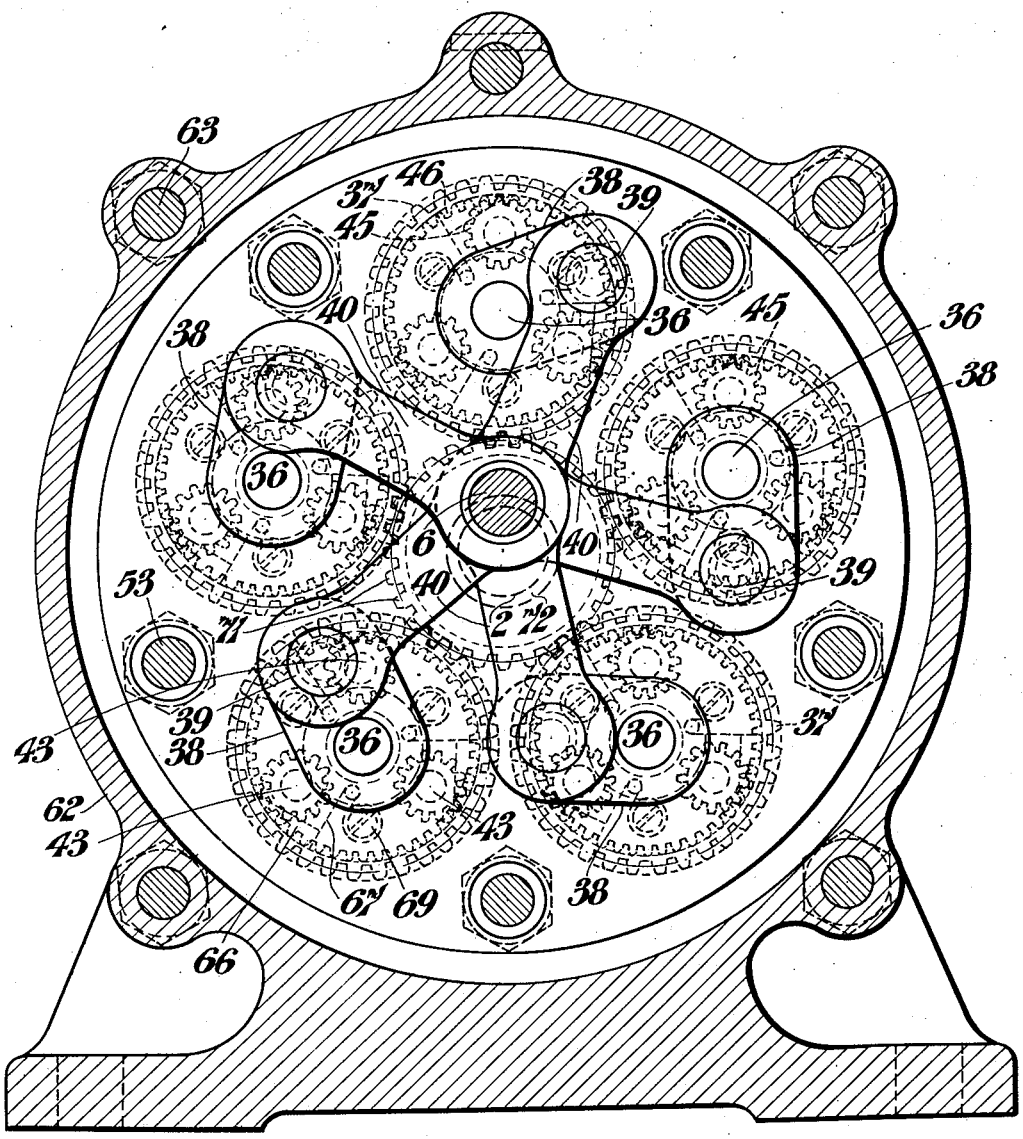

The pinions 37 of which there are five as shown in Figure 2 on an enlarged scale, gear with a central wheel 71 carried by a sleeve or hollow shaft 72 which rotates on a bushing 73 on the central shaft 34 and also in the centre of the boss 51 of the end member 52 of the framing of the mechanism. The hollow shaft 72 extends through the boss 51 and is provided on such extending portion with a sleeve 74 fixed thereon by a screw 75. The sleeve 74 is provided with a feather or key 76 which slides in a key way in a longitudinally slidable inner sleeve 77 which slides in an outer sleeve 78 having a flange 79 by which it is supported from the end 52 of the framing by bolts 80. The other end of the sleeve 77 has an internal key way sliding on a feather 81 secured on a boss 82 extending outwards from the end 52 of the framing of the mechanism. By this construction, when the inner sleeve 77 is moved to the left, which movement is limited by the shoulder of an enlarged end portion 83, both feathers 76 and 81 will be in the key way in the sleeve 77 and so the hollow shaft 72 carrying the central gear 71 will be prevented from rotation as the boss 82 is fixed to the frame, but when the sleeve 77 is moved inwards it will slide off the feather 76 and so leave the hollow shaft 72 carrying the central gear 71 free to rotate. Any suitable number of feathers or keys 76 and 81 may be provided at suitable spaces in the inner sleeve 77. The longitudinal movement of the sleeve 77 is effected by a forked lever 84 having a fulcrum pin 85 in a bracket 86, and from diametrically opposite points of the inner sleeve 77 extends trunnion pins 87 operating in slots 88 in the forks of the lever 84. The upper end of the lever 84 is slotted to engage pins 89 on a rod 90 sliding longitudinally through the standard 62 and the ends 52 and 60 of the framing of the mechanism. In order to keep the sleeve 77 in its extreme left position a spring 91 is arranged on the sliding rod 90, this spring bears at one end against a flange 92 provided on the rod 90 and at the other end against the end member 52 of the framing.

In the operation of the combined mechanism so far described the variable throw crank 6 through the connecting links 40 transmits motion to the secondary cranks 38 on the shafts 36 of the pinions 37 of the epicyclic gearing, and these shafts 36 through the annular clutch members 41 fixed thereon transmit motion by means of the wedges 66 to the pinions 37 and so cause them to roll round the central gear 71 when the hollow shaft 72 thereof is prevented from rotation by the feathers 81 and 76 engaging the key ways of the boss 82 and of the sleeve 74 respectively. The rolling around of the pinions 37 also carries their shafts 36 around and these rotate the disc 33 and its shaft 34. The shaft 34 may be connected to an output shaft 32 by a disconnectable clutch sleeve 93. As the amount of rotation of the secondary cranks 38 of the pinion shafts 36 varies with the throw of the crank pin 6 the speed of the output shaft 32 relatively to that of the input shaft 2 will vary with the throw of the crank pin 6 as adjusted by the lever 20.

In order to provide means whereby the hollow shaft 72 of the central gear 71 may be released automatically when the crank throw varying lever 20 has been moved over to a position in which the output shaft 32 is rotated at the same speed as the input shaft 2, as in direct drive conditions, the end of the sliding rod 90 projecting beyond the end 60 of the framing is provided with a catch engaging member 193 provided on its under side with a recess 94 adapted to be engaged by a catch 95 on a plate 96 secured to the lever 20.

The crank throw varying lever 20 is provided with a supplementary lever 97 moving on a fulcrum pin 99 and having a lower end 98 adapted to be engaged by a collar 100 fixed on a longitudinally movable rod 101. The end of the rod 101 is connected by a pin 102 to the end of a lever 103 having a fulcrum pin 104 mounted on the end 52 of the framing, the other end 105 of the lever is arranged to engage an arm 106 on a second lever 107 having a fulcrum pin 108 also on the end 52 of the framing. The lever 107 is connected by a pin 109 to one end of a rod 110 the other end of the rod 110 being connected to a clutch in the form of a brake block 111 sliding radially in a slot in boss 82 extending from the end member 52 of the framing. The inner end of the brake block 111 engages the hollow shaft 72 of the central gear 71 thereby constituting a secondary means for preventing rotation of the central gear 71. A spring 112 is provided to return the brake block 111 to the off position when tension on the rod 101 by the lever 97 and collar 100 is released.

In the operation of the example of the device constructed as described above, starting with the crank throw varying lever 20 at no-stroke position, that is the position in which the crank pin 6 is concentric with the input shaft 2, the pinion carrying shaft 34 being coupled to the output shaft 32 by the sleeve 93 and the inner key sleeve 77 being in the position in which its key way is on the feather 76 on the clutch sleeve 74, fixed on the hollow shaft 72 of the central gear 71 so that it is thereby prevented from rotation. With the parts in this position speed change can be effected by operating the crank throw varying lever 20, and after it has been moved over to a position in which the speed of the output shaft 32 is equal to that of the input shaft 2 further continued movement of the lever 20 will operate to bring the catch 95 into the recess 94 on the sliding rod 90 and so move the inner sliding keyway sleeve 77 to a position in which it slides off the feather 76 on the clutch sleeve 74 secured on the hollow shaft 72 of the central gear 71 and so leaves the central gear 71 free to rotate and then be locked to pinions 37 when the throw of the crank 6 is slightly greater than that of the cranks 38. Owing to this release of the central gear 71 the planetary gears 37 might be rotated without revolving about the central gear and without, therefore, imparting rotary movement to the carrier plate 33 fixed to the driven shaft. At this stage in the operations the supplementary lever 97 on the crank throw varying lever 20 is operated to bring into operation the brake 111 provided on the hollow shaft 72 carrying the central gear 71 and so bring the pinion wheels 37 again into operation, after which the crank throw varying lever may be returned to neutral or no-stroke position, and in so doing the rod 90 slides the sleeve 77 on to the feather 76 and then the catch 95 is released and the rod 90 held in such position by the spring 91. The brake 111 enables the hollow shaft 72 to be temporarily held from rotation while the key way in the sleeve 77 is being moved over the feather 76.

In order to make the variable speed gear reversible clutch mechanism is provided whereby the hollow shaft 72 of the centre gear wheel 71 can be allowed to rotate freely and be connected directly to the output shaft 32, such clutch mechanism at the same time declutching the central shaft 34 carrying the pinions 37, from the output shaft 32. To effect this the central shaft 34 can be held against rotation by a clutch consisting of a set of jaws 113 carried by the annular plate 47 of the pinion bearings and arranged to be engaged by a corresponding set of non-rotatable jaws 114 carried by an annular disc 115 secured on the ends of rods 116 sliding in holes in the end member 52 of the framing and forming at their other ends the bolts 80 holding the flange 79 of the outer sleeve 78. Around the rods 116 are arranged springs 117 which hold the annular disc 115 against the end 52 of the framing, that is in the position in which the jaw member 114 is out of contact with the jaw member 113 of the pinion carrier mounted on the shaft 34.

The clutch sleeve 74 fixed on the end of the hollow shaft 72 carrying the central gear 71 forms at its outer end the non-slidable member 123 of a clutch of the central gear 71, the other or axially slidable member 124 of the clutch being formed on the adjacent end of the sleeve 93 extending over the ends of both the output shaft 32 and central shaft 34 so as to couple them by a key way provided therein and adapted to slide longitudinally over a feather key 118 provided at the end of the shaft 32 and also over a feather key 119 provided at the end of the shaft 34. This sleeve 93 is provided with an external circumferential groove 120 whereby it can be moved longitudinally by rollers 121 fitting therein and mounted on a reversing lever 122. The central portion of the bore of the sleeve 93 is grooved so that when the sleeve is moved to bring the jaw members 123 and 124 into engagement the key feather 119 on the central shaft 34 carrying the pinions 37 will be in such groove and allow the sleeve 93 to rotate freely over it. The reversing lever 122 moves on a fulcrum 125 supported on a bracket 126 and operates to slide the sleeve 93 to disconnect the output shaft 32 from the central shaft 34 carrying the pinions 37 and connect it to the clutch sleeve 74 on the hollow shaft 72 of the central gear 71, when, further movement of the reversing lever 122 operates to move the outer sleeve 78 to which it is operatively connected by a bracket 127 secured to the sleeve by bolts 128. The fulcrum end of the lever 122 is forked and the outer end of the bracket 127 has a slot 129 in which operates a pin 130 fixed on one of the forked members of the lever 122, a similar bracket and pin are provided at the opposite side of the sleeve 93, so that the lever 122 when moved to the right will move the sleeve 78 carrying the rods 116 and jaw clutch member 114 into engagement with the clutch member 113 and so prevent rotation of the central shaft 34. With the parts in this position the carrier of the pinions 37 being fixed by the clutch members 113 and 114 the pinions 37 when driven by the input shaft 2, crank 6, connecting links 40, cranks 38 shaft 36 one way clutch within the member 41, rotate the central gear 71 in the reverse direction, the hollow shaft 72 of this gear communicating motion through the clutch jaws 123 and 124 and sleeve 93 to the output shaft 32.

Figure 6:
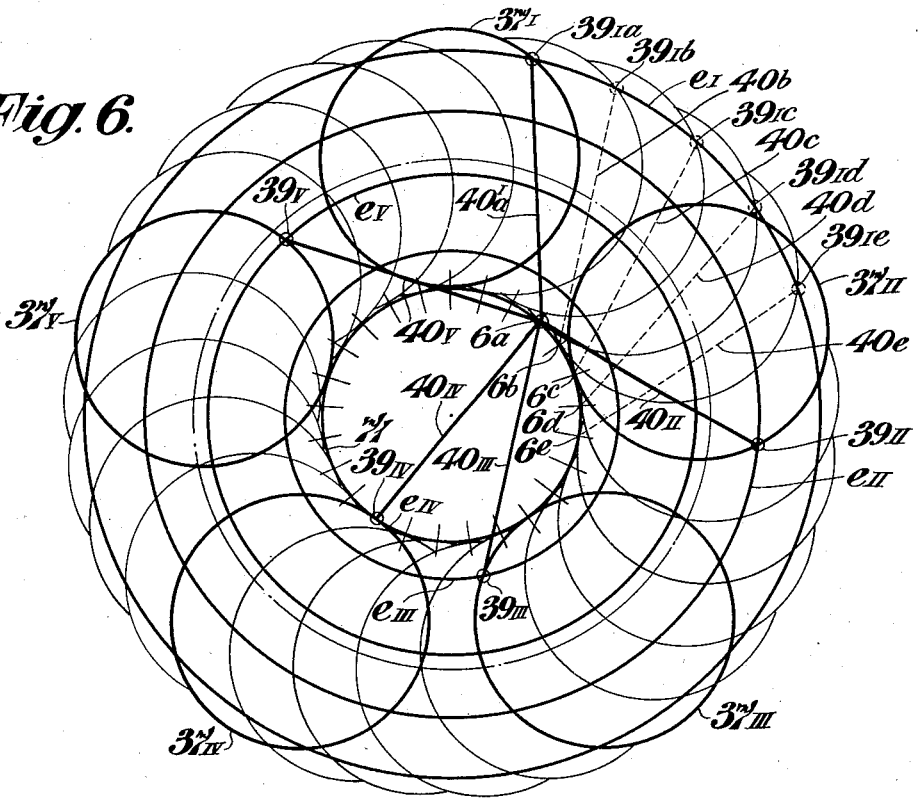

Figure 6 illustrates diagrammatically the loci of the crank pins $39_I$ to $39_v$ driving the five pinions $37_I$ to $37_v$ around the central gear 71, the crank pins 39 being shown as of the same radius as the pitch circle of the pinions 37 for clearness, and for the same reason the throw of the crank 6 is the same as the pitch radius of the central gear 71 and slightly greater than the throw of the cranks 38. In this diagram the loci of the crank pins $39_I$ to $39_v$ are concentric circles $e_I$ to $e_v$, and the speed of the output shaft is equal to that of the input shaft. In this diagram five successive positions $40_a$ to $40_e$ of the link $40'a$ connecting the variable throw crank pin with the crank pin $39_I$ of the pinion $37_I$ are given to show that the locus of the pin $39_I$ is a closed circular curve.

Figure 7:
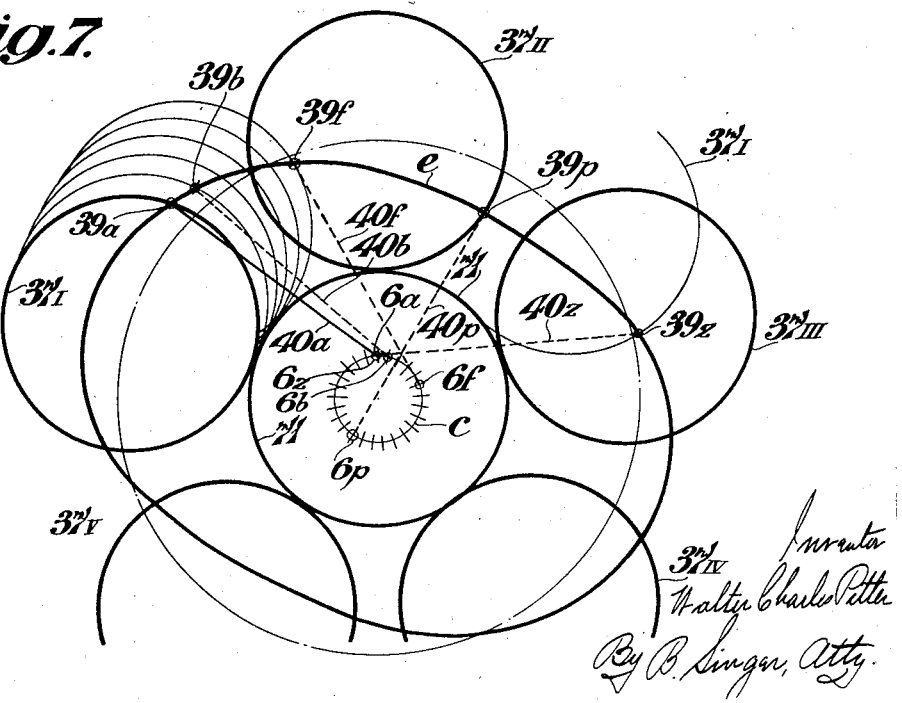

In the diagram shown in Figure 7 the throw of the crank pin 6 has been considerably reduced so that the locus of the crank pin 6 is a circle $c$ of a radius less than half of that of the pitch line of the central gear 71, while the locus of each crank pin 39 is a closed elliptical curve $e$ formed by drawing a line through the successive positions of the crank pin 39 due to the successive positions $40a$, $40b$, $40f$, $40p$, and $40z$, of the links 40, the elliptical curve $e$ of only one of the links 40 being shown.

Figure 8 illustrates the case when the throw of the crank pin 6 has been increased to such an extent that its circular path $c$ is nearly equal to the pitch circle of the central gear 71 so that the locus of each crank pin 39 is on an involute curve $f, f1 \ldots$ to $f5$.

This involute curve also is a closed curve, the crank pin 39 of each of the planetary gearings in the system traveling through the different branches $f_1, f_2, f_3$, etc. of the curve successively until the curve is closed.

In Figure 9 the crank circle $c$ of the crank pin 6 has been reduced to a very small value, that is it is very near to no-stroke position, this results in a locus consisting of a sinuoidal circular line $g$ as the locus of each crank pin 39.

Figure 10:
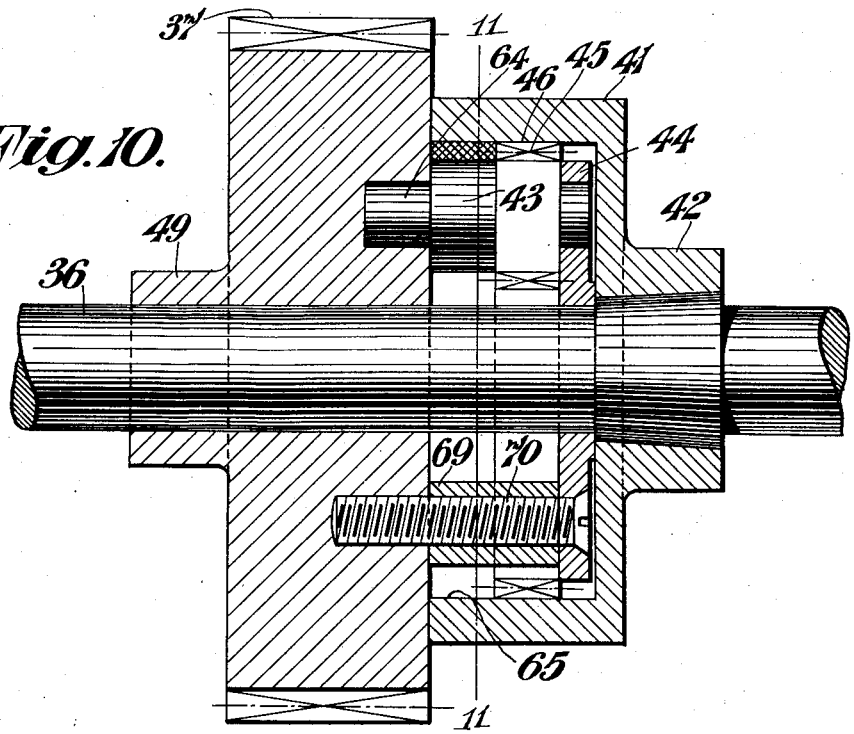
Figure 10 is a longitudinal section of a one-way clutch as used in Figure 1.
Figure 11:
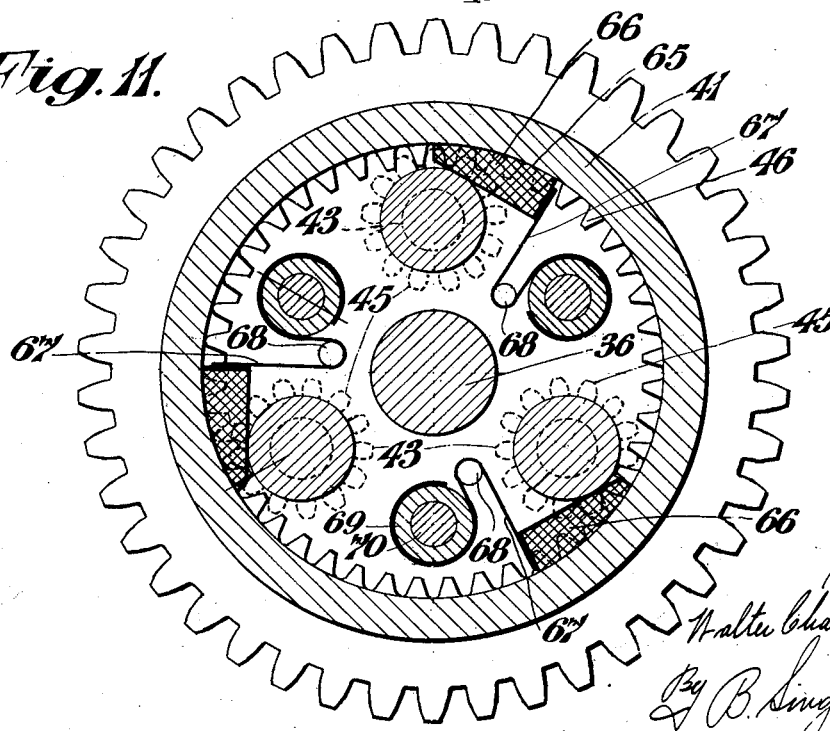
Figure 11 is a transverse section through 11—11 Figure 10.
Figure 12:
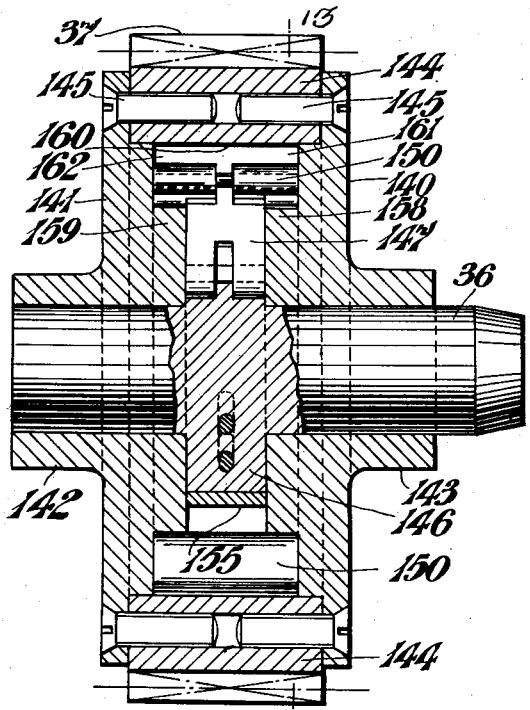
Figure 12 is clutch which may be used as an alternative to the clutch shown in Figure 10.
Figure 13:
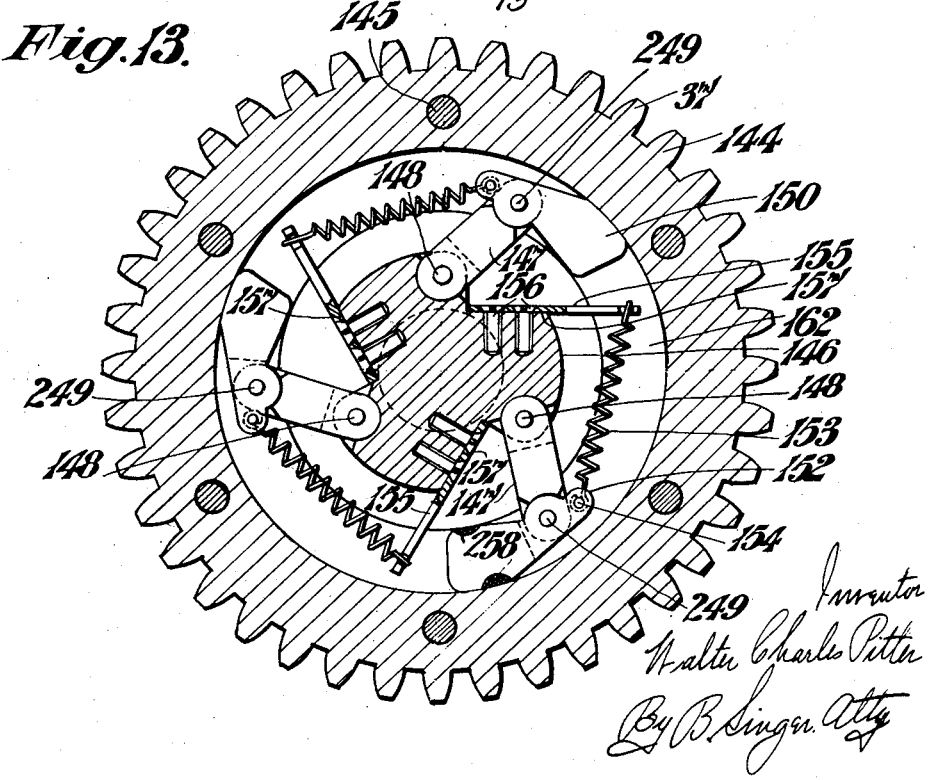
Figure 13 is a transverse section through 13—13 Figure 12.

In Figures 12 and 13 are illustrated a one way clutch which may be used as an alternative to that illustrated in Figs. 10 and 11 to drive the pinions 37.

In this example each pinion 37 is built up of a ring member 144 containing on its outer periphery the teeth and connected by screws 145 to two side discs 141 and 140 having hubs 142 and 143 rotating on the shaft 36.

The shaft 36 has a central flange portion 146 recessed at uniform circumferential distances to receive the ends of three links 147 which are connected to the flange by pins 148 to form knuckle hinge joints, the other ends of the links being connected in a similar manner by pins 249 to clutch pieces 150. Each clutch piece 150 has a rearwardly extending member 152 to which one end of a gripper controlling spring 153 is connected by a pin 154, the other end of the spring being connected to the outer or free end of a plate 155 connected at its inner end by screws 156 to flat faces 157 formed in the recesses in the flanged portion 146 of the shaft 36.

On the inner faces of the side disc 140 and 141 are formed two circular portions 158 and 159 of reduced diameter, so that their outer edges will form the inner sides of two annular grooves 161 and 162 into which the side portions of the clutch pieces 150 extend laterally, the outer sides of the two grooves 161 and 162 being formed by the inner surface 160 of the ring 144. The forward portion of the clutch pieces 150 fitting in the annular grooves 161 and 162 are of such a width and shape that when tilted in the plane of the wheel they will grip the opposite sides of the grooves at points slightly out of alignment with a line passing through the centre of the shaft 36, and these points may be provided with renewable bearing pieces 258 of semicircular section at the back so as to adjust themselves as the clutch pieces 150 are tilted.

The tilting of the clutch pieces 150 in the plane of the wheel 37 is effected by the rotation of the shaft 36 and the resistance to rotation of the wheel 37, such resistance causing the links 147 to push radially outwards the rear end of the clutch pieces 150 and so effect the tilting necessary to cause the portions projecting laterally in the annular grooves 161 and 162 to grip the opposite sides of the grooves and so effect clutching of the shaft 36 with the pinion 37. The reverse movement of the shaft 36 tends to tilt the clutch pieces 150 in the opposite direction so that they will slide freely in the annular grooves 161 and 162 in the pinion 37.

What I claim and desire to secure by Letters Patent is:—

1. A variable speed transmission gearing, comprising in combination a driving crank shaft. a driven shaft alined therewith, a second crank shaft. a link between the two crank shafts, a gear loose on the second crank shaft, a one-way clutch between the second crank shaft and the gear, a carrier for said gear fixed to the driven shaft, a second gear in mesh with the first named gear and loosely mounted on the driven shaft, and means for locking said second gear on the driven shaft against rotation.

2. A variable speed transmission gearing, comprising in combination a driving shaft, a driven shaft alined therewith, a crank on the driving shaft, a third shaft parallel to said first named shaft, a crank on the third shaft, one of said cranks being adjustable relatively to its shaft, a link between the two cranks, a gear loose on the third shaft, a one-way clutch between the third shaft and said gear, a carrier for said gear fixed to the driven shaft, a second gear in mesh with the first named gear and loosely mounted on the driven shaft, and means for locking said second gear on the driven shaft against rotation.

3. A variable speed transmission gearing, comprising in combination a driving shaft, an adjustable throw crank thereon, a driven shaft alined with the driving shaft, a third shaft, a crank on the third shaft, a link connecting the cranks, a gear loose on the third shaft, a one-way clutch actuated by the second crank and operatively connected with the gear, a carrier for the gear fixed on the driven shaft, a second gear in mesh with the first named gear and loosely mounted on the driven shaft, and means for locking said second gear on the driven shaft against rotation.

4. A variable speed transmission gearing, comprising in combination a frame, a driving shaft rotatably supported therein, a driven shaft, a tubular shaft loose on the driven shaft, a sun gear fixed to said tubular shaft, a planetary gear revoluble about the driven shaft and supported thereon, a clutch for said planetary gear, connecting rods extending from the driving shaft to the clutch for rotating the planetary gear about its axis, and means for normally maintaining the sun gear shaft locked on the frame.

5. A variable speed transmission gearing comprising in combination a driving shaft, a driven shaft, a tubular shaft loose on the driven shaft, a sun gear fixed on said tubular shaft, a planetary gear supported by the driven shaft and revoluble about the sun gear shaft, a clutch for said planetary gear, means operable from the driving shaft for actuating the clutch for rotating the planetary gear about its own axis, and means for locking the sun gear shaft in driven relation with the drive shaft.

6. A variable speed transmission gearing comprising in combination a driving shaft, a driven shaft, a tubular shaft loose on the driven shaft, a sun gear fixed to said tubular shaft, a planetary gear supported by the driven shaft and revoluble about the sun gear shaft, a clutch for the planetary gear, means operable from the driving shaft for actuating the clutch of the planetary gear, a locking sleeve slidable axially on the sun gear shaft and normally locked against rotation therewith, and means for releasing the lock of said sleeve on the sun gear shaft.

7. A variable speed transmission gearing, comprising in combination a drive shaft, a driven shaft, a tubular shaft loose on the driven shaft, a sun gear fixed to said tubular shaft, a planetary gear supported by the driven shaft and revoluble about the sun gear shaft, an adjustable crank on the drive shaft, a clutch for the planetary gear, means operable by said crank for actuating the clutch of the planetary gear, means for normally locking said sun gear shaft against rotation, and means for adjusting said crank to a predetermined relation to the drive shaft and for releasing said locking means.

8. A variable speed transmission gearing comprising in combination a drive shaft, a driven shaft, a tubular shaft loose on the driven shaft, a sun gear fixed to said tubular shaft, a planetary gear supported by the driven shaft and revoluble about the sun gear shaft, a crank on the drive shaft, a clutch for the planetary gear, means operable by said crank for actuating the clutch of the planetary gear, means for adjusting the eccentricity of said crank relatively to the drive shaft, means for locking the sun gear shaft against rotation, and means operable upon attainment of maximum adjustment of said crank for releasing the sun gear shaft.

9. A variable speed transmission gearing comprising in combination a drive shaft, a driven shaft, a tubular shaft loose on the driven shaft, a sun gear fixed to said tubular shaft, a planetary gear supported by the driven shaft and revoluble about the sun gear shaft, a clutch means operable from the drive shaft for rotating the planetary gear about its own axis at selectively determined speeds, means for normally locking the sun gear shaft against rotation, means for releasing the locking means upon attainment of a predetermined speed of the planetary gear, and additional means for re-locking said sun gear shaft against rotation upon reducing the speed of the planetary gear from said predetermined speed.

10. A variable speed transmission gearing, comprising in combination a drive shaft, a driven shaft, a tubular shaft loose on the driven shaft, a sun gear fixed to said tubular shaft, a planetary gear supported by the driven shaft and revoluble about the sun gear shaft, a clutch means operable from the drive shaft for rotating the planetary gear about its axis, a lever for adjusting the clutch means to selectively determine the speed of the planetary gear, means for locking the sun gear shaft normally against rotation and for releasing the same to be rotated by the planetary gear in a predetermined position of said lever, and means supported by said lever for re-locking said gear prior to any movement of the lever from said predetermined position.

11. A variable speed transmission gearing comprising in combination a drive shaft, a driven shaft, a tubular shaft loose on the driven shaft, a sun gear fixed to said tubular shaft, a planetary gear supported by the driven shaft and revoluble about the sun gear shaft, a crank on the drive shaft, a lever operable to adjust the crank, a clutch in driving relation to the planetary gear, a link extending from the crank to the clutch, means for locking the sun gear shaft against rotation, and a connecting member extending between said lever and said locking means operable to release said locking means upon predetermined adjustment of the crank effected by said lever.

12. A variable speed transmission gearing comprising in combination a drive shaft, a driven shaft, a tubular shaft loose on the driven shaft, a sun gear fixed to said tubular shaft, a planetary gearing interposed between the sun gear shaft and driven shaft and actuated by the drive shaft, clutch means between the planetary gearing and the drive shaft means for locking the sun gear shaft against rotation to drive the driven shaft from the drive shaft through said planetary gearing, an output shaft in alinement with the driven shaft, a clutch normally connecting the driven shaft and output shaft, and means for moving said last named clutch to release position from the driven shaft and to operative relation with the sun gear shaft.

13. A variable speed transmission gearing comprising in combination a drive shaft, a driven shaft, a tubular shaft loose on the driven shaft, a sun gear fixed to the tubular shaft, planetary gears interposed between the sun gear shaft and driven shaft and actuated by the drive shaft, clutch means between the planetary gearing and the drive shaft, means for locking the sun gear shaft against rotation and for driving the driven shaft from the drive shaft through the planetary gearing, means for releasing said locking means of the sun gear shaft, an output shaft in alinement with the driven shaft, a clutch normally connecting the driven shaft and output shaft, means for moving said last named clutch to release position from the driven shaft and to operative relation with the sun gear shaft, and means operable by said last named clutch for locking the driven shaft when the clutch is connected with the sun gear shaft.

14. In a variable speed transmission gear, the combination of a driving shaft, a variable throw eccentric thereon, planetary gears, means under control of the eccentric for moving the gears epicycloidically, a driven shaft and means for converting the epicycloidal movement of said planetary gears into a rotary movement of the driven shaft, said first named means comprising connecting rods extending from the eccentric and having their inner ends in axial alignment with said eccentric and clutches connected to the outer ends of said connecting rods and interposed between them and the planetary gears.

15. In a variable speed transmission gear, the combination of a driving shaft, a variable throw eccentric thereon, planetary gears, means under control of the eccentric for moving the gears epicycloidically, a driven shaft and means for converting the epicycloidal movement of said planetary gears into a rotary movement of the driven shaft, said first named means comprising connecting rods extending from the eccentric and having their inner ends axially aligned on the eccentric and loosely movable about the common axis of the eccentric and clutches interposed between the outer ends of the connecting rods and the planetary gears, said connecting rods being under tensional strain in all positions of the eccentric and planetary gears.

In witness whereof I affix my signature.

WALTER CHARLES PITTER.